United States Patent
Balbach

(10) Patent No.: US 7,324,948 B2
(45) Date of Patent: Jan. 29, 2008

(54) CONTEXT-SPECIFIC CONTACT INFORMATION

(76) Inventor: Carl Teo Balbach, 176 Park St., Buffalo, NY (US) 14201

( * ) Notice: Subject to any disclaimer, the term of this patent is extended or adjusted under 35 U.S.C. 154(b) by 536 days.

(21) Appl. No.: 09/759,536

(22) Filed: Jan. 12, 2001

(65) Prior Publication Data

US 2001/0032095 A1    Oct. 18, 2001

Related U.S. Application Data

(60) Provisional application No. 60/176,364, filed on Jan. 14, 2000.

(51) Int. Cl.
*G06Q 99/00* (2006.01)
(52) U.S. Cl. ........................................................ 705/1
(58) Field of Classification Search .................... 705/1
See application file for complete search history.

(56) References Cited

U.S. PATENT DOCUMENTS

| | | | |
|---|---|---|---|
| 4,823,306 A | | 4/1989 | Barbic et al. ............... 364/900 |
| 5,438,355 A | * | 8/1995 | Palmer ....................... 725/110 |
| 5,570,295 A | * | 10/1996 | Isenberg et al. ......... 379/90.01 |
| 5,708,478 A | * | 1/1998 | Tognazzini ................. 348/552 |
| 5,708,825 A | | 1/1998 | Sotomayor .................. 395/762 |
| 5,742,769 A | | 4/1998 | Lee et al. ............. 395/200.36 |
| 5,754,939 A | | 5/1998 | Herz et al. ................... 455/4.2 |
| 5,907,793 A | * | 5/1999 | Reams ........................ 725/122 |
| 5,944,787 A | | 8/1999 | Zoken ......................... 709/206 |
| 5,991,737 A | * | 11/1999 | Chen ........................... 705/26 |
| 6,076,094 A | * | 6/2000 | Cohen et al. ............. 707/104.1 |
| 6,230,325 B1 | * | 5/2001 | Iinuma et al. .............. 725/110 |
| 6,233,736 B1 | * | 5/2001 | Wolzien ..................... 725/110 |
| 6,239,794 B1 | * | 5/2001 | Yuen et al. .................. 725/41 |
| 6,253,069 B1 | * | 6/2001 | Mankovitz ............... 455/186.1 |
| 6,323,853 B1 | * | 11/2001 | Hedloy ....................... 345/810 |
| 6,349,299 B1 | * | 2/2002 | Spencer et al. .............. 707/10 |
| 6,529,724 B1 | * | 3/2003 | Khazaka et al. ........... 455/405 |
| 6,628,928 B1 | * | 9/2003 | Crosby et al. ............... 455/77 |
| 6,658,662 B1 | * | 12/2003 | Nielsen ...................... 725/109 |
| 2002/0068551 A1 | * | 6/2002 | Strunk et al. ............... 455/414 |

FOREIGN PATENT DOCUMENTS

WO        WO 0005679 A1 *  2/2000

OTHER PUBLICATIONS

"Joining Television and the Internet Using Java," Internet Week, v2, n14, Apr. 1, 1996.*
Raeder, Aggi, "Web resources for finding people." Searcher, v5, n8, p8, Sep. 1997.*

(Continued)

*Primary Examiner*—Jonathan Ouellette
(74) *Attorney, Agent, or Firm*—Hodgson Russ LLP

(57) ABSTRACT

A method of selecting contact information is disclosed. In the method, a signal corresponding to a source document is received and analyzed to determine a referenced entity. A data base of contact information and related contact entities is provided and searched to determine whether the referenced entity is among the contact entities. If the referenced entity is among the contact entities, the corresponding contact information is provided. The provided contact information may be used to address a message from a sender to a recipient. A system and an article of manufacture for carrying out the method is also disclosed.

42 Claims, 4 Drawing Sheets

OTHER PUBLICATIONS

Berenci, E., Carpineto, C., Giannini, V., and Mizzaro, S.; "Effectiveness of Keyword-Based Display and Selection of Retrieval Results for Interactive Searches," International Journal on Digital Libraries, Nov. 3, 2000, vol. 3, No. 3, pp. 249-260.

Myers, Eugene W.; "A Sublinear Algorithm for Approximate Keyword Searching," Algorithmica, Oct. 1994, vol. 12, Nos. 4-5, pp. 345-374.

Watson, B.W. and Zwaan, G.; "A Taxonomy of Sublinear Multiple Keyword Pattern Matching Algorithms," SCIPROG: Science of Computer Programming, Sep. 1996, vol. 27, No. 2, pp. 85-118.

* cited by examiner

CONTEXT-SPECIFIC CONTACT INFORMATION

CROSS CLAIM TO RELATED APPLICATION

Priority is hereby claimed to U.S. Provisional Patent Application No. 60/176,364 filed on Jan. 14, 2000, and is hereby incorporated by this reference.

BACKGROUND OF THE INVENTION

1. Field of the Invention

The present invention relates generally to devices and methods of processing information.

2. Discussion of Related Art

There is currently no efficient way to read or otherwise consume an article of text or watch television, and contact the individuals and organizations referenced in the article or television program. An individual seeking to contact the subject of the article or television program must rely on inefficient means to find contact information corresponding to the subject of the article or television program. Finding such contact information can be a protracted process, and may take several days, if the contact information can be found at all. Current means of finding contact information include using telephone directories, utilizing a search engine associated with the Internet, or searching an organization's web site. Complicating a search for contact information is the fact that certain organizations, such as large corporations and government entities, may contain hundreds or thousands points of contact, only some of which may be listed through generally available means. As an example, a person wishing to contact the Crash Testing and Safety Group at General Motors would have a difficult time quickly finding the proper contact information.

SUMMARY OF THE INVENTION

The present invention provides methods, and devices that provide readers or viewers the ability to efficiently contact the subjects of an article or video presentation, such as a television show. For example, news and commentary contain content about individuals and organizations, herein sometimes referred to collectively as "entities", and these entities may or may not desire to receive messages from readers of an article or viewers of a video presentation. Furthermore, such readers and viewers may desire sending a message to such entities. Entities may include sports stars, politicians, corporate executives, movie stars, musicians, foreign dignitaries and public officials, business entities, non-profit organizations, athletic teams, religious institutions and government departments. As an example, an individual might read an article on a web site discussing local environmental abuses by a particular corporation. The reader might wish to contact at least three groups of people relating to the article: 1) local, regional, national corporate managers; 2) local and regional representatives of the Environmental Protection Agency; and 3) the local, regional and national politicians that have an interest in the case. Obtaining accurate contact information requires three primary steps: 1) understanding which organizations are involved with, have jurisdictions over, or are accountable to the issue at hand; 2) figuring out what are the appropriate points of contact within these organizations with regard to the issue at hand; and 3) finding the contact information, e.g. physical address or email, for the individuals or offices within the appropriate entity. To execute these three steps could easily take several days.

The present invention allows readers and viewers to rapidly select a desired recipient, and send a message, either electronically or physically, to the recipient. For example, the invention scans a document, and matches it against a database of known individuals and organizations. The present invention may examine the context of the article to establish: 1) the points of contact within an entity that the reader or viewer most likely wishes to contact; and 2) entities that are not explicitly referenced in the article or video presentation, but may have substantive bearing on the issues discussed in the article or video presentation. The invention may also track the most frequently selected recipients associated with a particular article or video presentation in order to serve the reader or viewer a prioritized list of potential recipients.

Due to the ease with which the present invention allows readers and viewers to send messages to entities, it is anticipated that the volume of messages received by entities will be large. In order to manage the large volume, the present invention may include message management services for participating entities. These management services may allow entities to filter incoming messages, post preconditions for sending messages, and query the existing history of stored messages.

BRIEF DESCRIPTION OF THE DRAWINGS

For a fuller understanding of the nature of the invention, reference should be made to the following description taken in conjunction with the accompanying drawings, in which.

DESCRIPTION OF EMBODIMENTS OF THE INVENTION

From time to time, certain terms will be used herein, and these terms shall be interpreted to have the meaning set forth below:

Non-participating Recipient—A Non-participating Recipient is a potential Recipient (defined below) that is aware of a service provided according to the present invention and does not wish to receive messages enabled by the service.

Organization—An Organization includes a company, collective, partnership, sports team, non-profit entity, government, religious organizations, educational establishment, institution, or otherwise organized collection of persons.

Participating Recipient—A Participating Recipient is a potential Recipient of a message generated using the present invention who is aware of the service and wishes to receive messages from a site providing messages according to the present invention, and therefore may choose the manner in which it receives such messages.

Point of Contact—A Point of Contact is an individual or office within an Organization that a Sender (defined below) wishes to contact. The term "contact entity" is sometimes used herein to refer to a point of contact. For Organizations, a Point a Contact may be a particular office or professional discipline within the Organization (e.g. Treasurer) that may be staffed by different individuals over time.

Recipient—A Recipient is an individual or Organization that may receive a message from a Sender. There may be multiple Recipients for a single Point of Contact. Also, the Recipient or Recipients associated with a particular Point of Contact inside an Organization may change over time to adapt to the Organization's personnel fluctuations.

Recipient Interaction Request—A Recipient Interaction Request is information that a Participating Recipient wishes to display to a Sender before the Sender completes their message to the Recipient. These Recipient Interaction Requests may include a survey, advertisement, information about an upcoming event schedule, a monthly update letter, etc. Recipient Interaction Requests are a logical subset of the various preconditions that must be satisfied before a message can be sent.

Sender—A Sender is an individual that desires to send a message to a particular Point of Contact.

Referenced Entity—A referenced entity is an entity that is referenced in a Source Document, or may be associated with the subject matter of the Source Document.

Source Document—Source Documents include the article or information which discusses an issue relating to a Point of Contact. Source Documents may be a signal corresponding to an article of text or an audio signal. Source Documents may be provided in a particular format, for example, HTML, proprietary word processing formats, standard text or audio.

Figure 1:
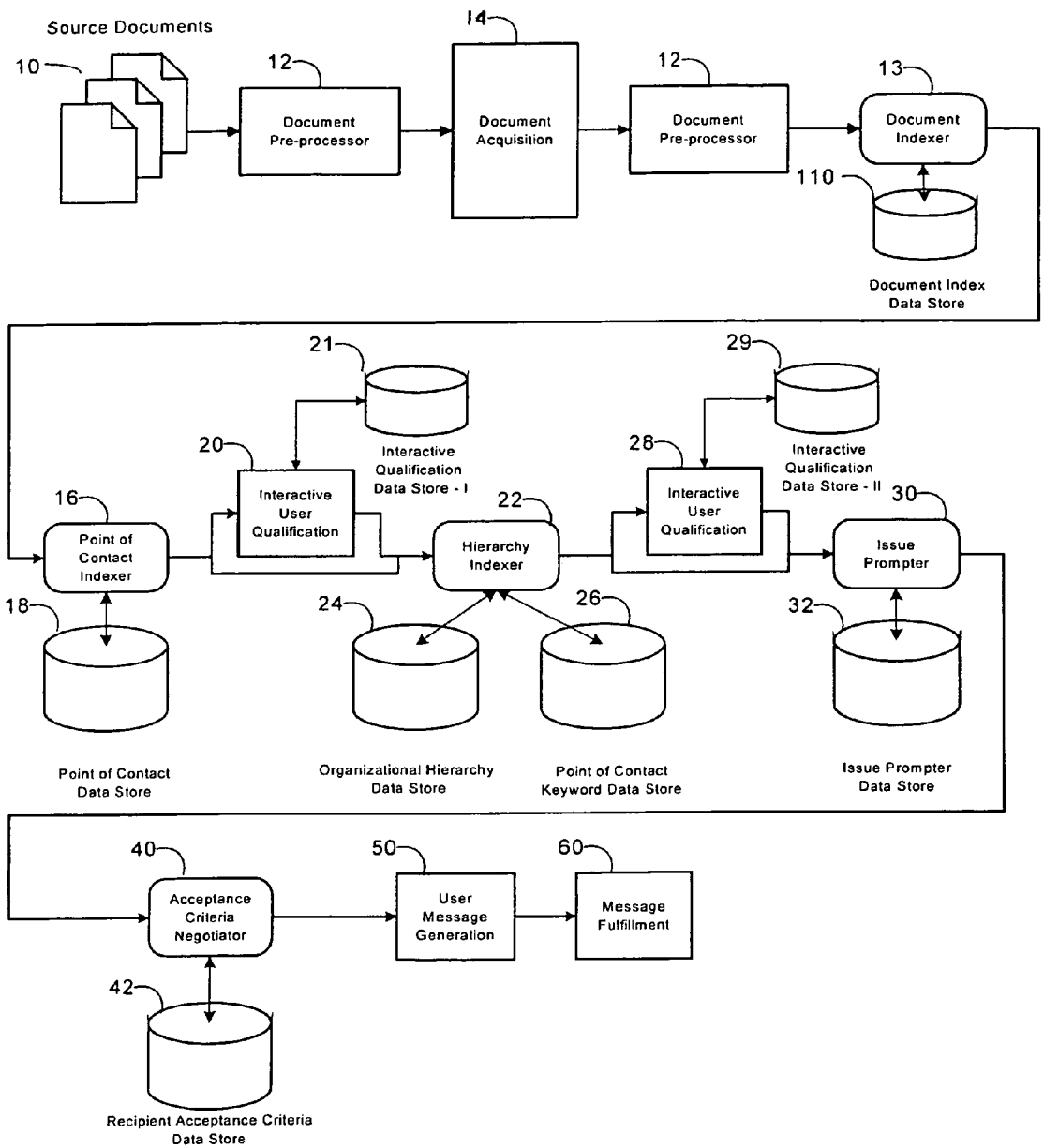
FIG. 1 is as flow diagram illustrating a method according to the present invention.
Figure 2:
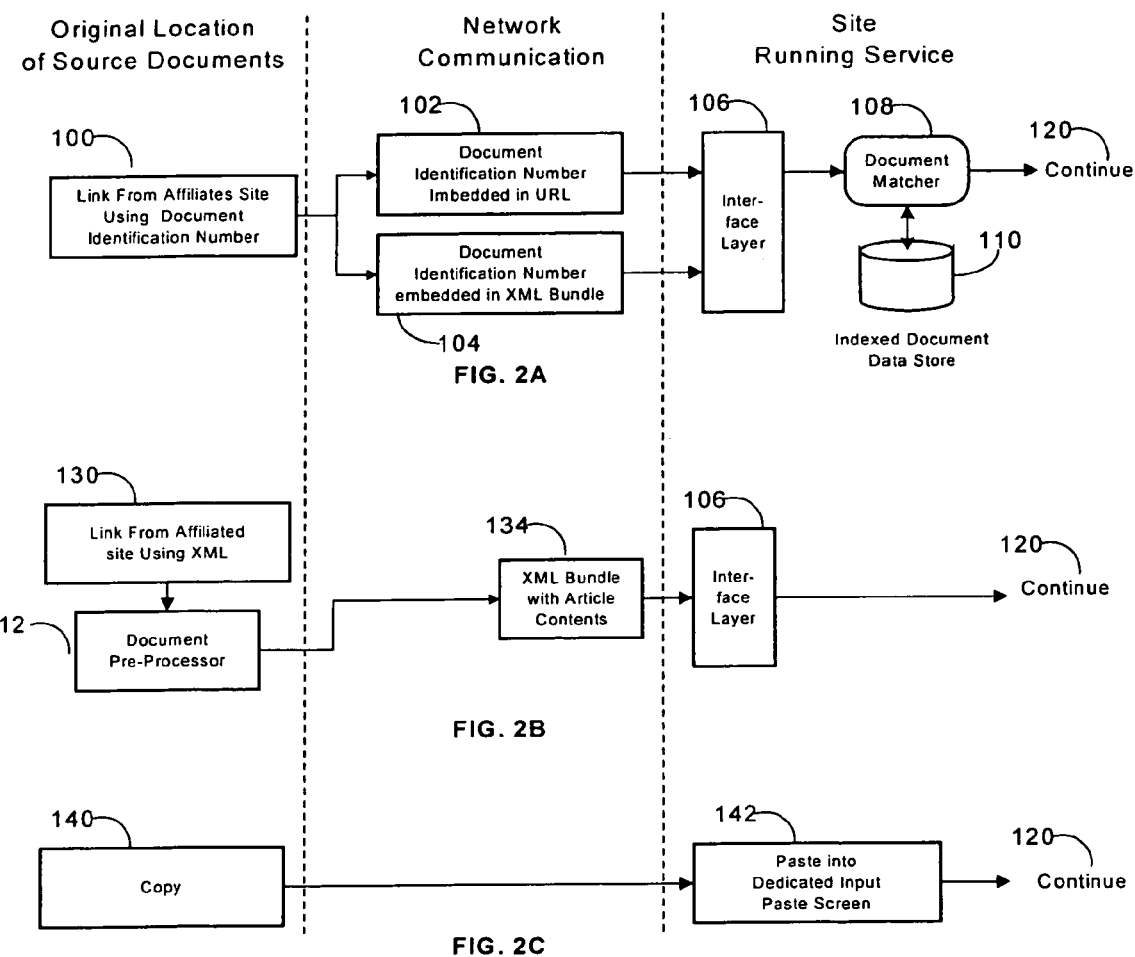
FIG. 2A is a flow diagram illustrating a method according to the present invention in which a document identification number is provided, for example embedded in a URL or via an XML bundle, from a site having source documents to a site having an article of manufacture, such as a computer disk, according to the present invention.
FIG. 2B is a flow diagram illustrating a method according to the present invention in which document preparation takes place in the same location as the source documents, and a portion of the contents of the document are sent over the Internet using XML to a site running the invention.
FIG. 2C is a flow diagram illustrating a method according to the present invention in which source documents are electronically copied from the original source and pasted into an input field on a site having an article of manufacture according to the present invention.

In FIG. 1, Source Documents 10 are taken and acquired into the system via the Document Acquirer 14. For example, a signal corresponding to a Source Document 14 may be provided to a document pre-processor 12 either before of after the Document Acquirer 14. FIGS. 2A, 2B, and 2C, show three possible methods of acquiring a Source Document.

In FIG. 2A, a participating web site or broadcast partner passes an information containing document identification number 100 from their site to a site executing a method according to the present invention. The document identification number may be embedded in an XML bundle 104, or it may be passed as part of an URL 102 to be interpreted via common gateway interface ("CGI") or other server side service. The network interface layer 106 takes these incoming document identification numbers and provides them to the document matcher 108. The document matcher 108 checks the incoming document identification number against a database of indexed documents 110. To keep the database of indexed documents 110 current, the present invention executes a web-search routine that periodically scans the web sites of participating Organizations to keep a current index of their Source Documents.

FIG. 2B illustrates another method of acquiring a Source Document wherein a partner site operates a document pre-processor 12 that provides only the text of the article over the Internet using, for example, an XML bundle 134. The provided article is extracted from the XML bundle using a network interface layer 106 and continues 120 into the Document Indexer 13.

FIG. 2C illustrates another method of acquiring a Source Document in which an article is copied 140 from a text-based source and pasted 142 into a screen on a site that operates according to the present invention. The article then continues 120 to the document pre-processor 12, and the document indexer 16. It will now be apparent that a site operating according to the present invention may have editorial content and applicable links, in order to eliminate the need for passing article contents or article identification numbers over a network.

The document pre-processor 12 may remove special formatting codes which may exist in the document, such as HTML tags and word processor formatting codes. For example, a web page from an Internet site may be inputted into the system and the document pre-processor 12 will strip out all of the formatting codes and tags to leave a straight text input. When the Source Document is an audio signal, the document pre-processor 12 may separate the audio portion of the signal from any other portions, such as video), and may use speech recognition technology to determine the substance of the audio signal, or it may use text markups provided as part of a system for the hearing impaired as inputs to the present invention.

After incoming Source Documents are prepared by the document pre-processor 12, they are passed through a document indexer 13, which checks to see if the Source Document has been processed by the system before. If the Source Document is new to the system, an identification number for the Source Document is generated and stored, possibly with other information about the document, in a document index data store 110. If the Source Document has been processed by the system before, the document's identification number is used to speed certain subsequent parts of a method according to the present invention.

After leaving the document indexer 13, the document enters the point of contact indexer 16, where the entities referenced in the document are determined. The points of contact data store 18 includes a database of currently known Points of Contact, and it is searched to determine which of the referenced entities have corresponding Points of Contact in the points of contact data store 18. If the referenced entities in the Source Document do not have corresponding Points of Contact in the points of contact data store 18, the Sender is informed and a request for a new Recipient 202 is generated. The system administrator may also be informed when none of the referenced entities in the Source Document have corresponding Points of Contact in the points of contact data store 18.

After the Points of Contact for the Source Document have been identified, they are provided to an interactive user qualifier 20. The interactive user qualifier 20 displays the Points of Contact associated with the Source Document. Due to a variety of factors, including the length of the document, the point of contact indexer 16 may return relatively few potential Points of Contact, or it may return a very large number of potential Points of Contact. The interactive user qualifier 20 provides the Sender a list of the potential Points of Contact to assist the Sender in determining which of the potential Points of Contact to select.

If the Source Document has been processed by the system before, it is possible to use a first interactive qualification data store 21, in conjunction with the document identification number, to provide the most popular Points of Contact 18 affiliated with the document. For example, a popular document might pass through the system numerous times. Each time such a document passes through the system, the first interactive qualification data store 21 keeps track of the Points of Contact 18 that each Sender selects. For example, the first time a document is used to select referenced entities, a counter is established for each of the referenced entities selected. Each time the document is processed, the established counters are incremented when the corresponding referenced entity is selected. The list from which subsequent Senders are asked to select a Point of Contact can be prioritized according to the counters, and in doing so, subsequent Senders may be able to more efficiently find and select desired Points of Contact because subsequent Senders are likely to desire the same Points of Contact selected by prior Senders. In this fashion, the system can be considered to be "adaptive" or "self-learning" because each subsequent Sender requesting processing of the same document through the system can access a prioritized list of the Points of Contact corresponding to the document.

If the Sender selected only individuals, and no Organizations, then after the first interactive user qualifier 20, the Sender may be prompted by an issue prompter 30. However, if the Sender selected an Organization to contact, then the Points of Contact generated by the point of contact indexer 16 are provided to the hierarchy indexer 22. The hierarchy indexer 22 helps the Sender navigate through the many Points of Contact that may exist within a large Organization. The hierarchy indexer 22 searches the Organizational hierarchy data store 24 to determine all of the potential Points of Contact within the Organization.

For large Organizations with many potential Points of Contact, the hierarchy indexer 22 may consult the point of contact keyword data store 26 to prioritize a list of relevant Points of Contact within the Organization according to the context of the Source Document. As an example, if the Source Document references the United States Federal Government, and also discusses tax compliance issues without explicitly mentioning the Internal Revenue Service, the hierarchy indexer 22 would use the point of contact keyword data store 26 to provide the Sender with a list of contact information for various offices within the Internal Revenue Service.

Once the relevant Points of Contact have been prioritized, they are served to the Sender through a second interactive user qualifier 28. The second interactive user qualifier 28 is similar to the first interactive user qualifier 20 in that the Sender is given a set of prompts to select the desired Point of Contact. The second interactive user qualifier 28 makes use of the second interactive qualification data store 29 that tracks the popularity or frequency of selection of various Points of Contact by previous Senders who have processed the same Source Document through the System.

The issue prompter 30 works in conjunction with the issue prompter data store 32 to serve to the Sender any current issues related to the article. As an example, if a Source Document includes information about a potential new public works project, the issue prompter data store 32 might provide an interface that asks the Sender if it is for or against the public works project. The administrators of the system may determine which issues are significant enough to merit tracking and inputting to the issue prompter data store 32.

The issue prompter data store 32 can be used to categorize the messages for the Recipient, which is an enormous benefit for high volumes of messages on the same topic. For example, a survey may be provided to the Sender, and once completed, the Sender's answers to the survey questions are stored along with the message in the message data store 304 for subsequent analysis by the Recipient. The Recipient, may for example, select all of the messages corresponding to surveys answered in particular fashion.

Figure 3:
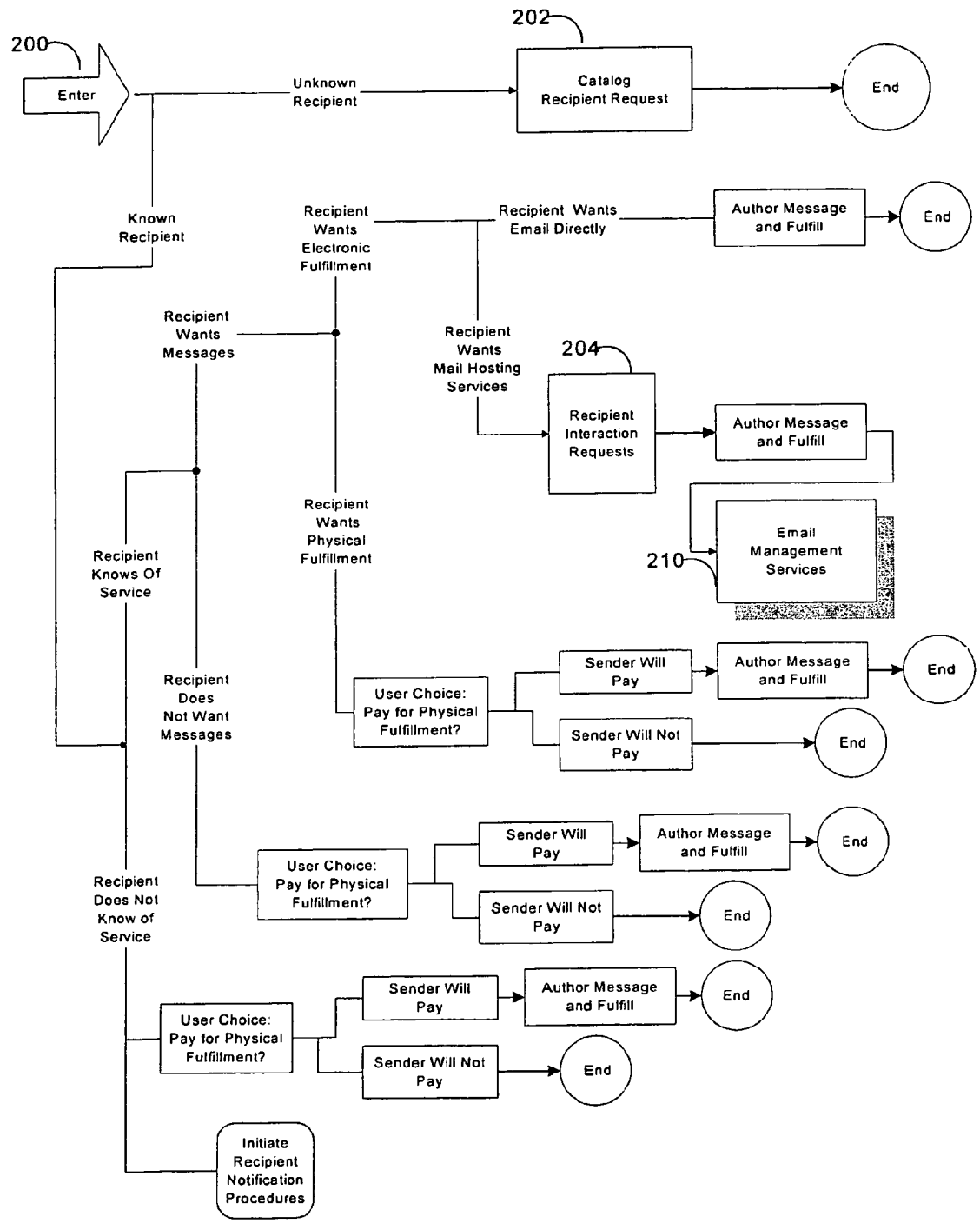
FIG. 3 is a flow diagram illustrating a method according to the present invention in which message recipients specify criteria for receiving a message and message senders (viewers or readers, as the case may be) are prompted to provide a message that meets the criteria.

In FIG. 3 a process referred to herein as "Acceptance Criteria Negotiation" is illustrated. Note that devices for performing the Acceptance Criteria Negotiation process are illustrated in FIG. 1 as items 40 and 42. The Acceptance Criteria Negotiation process is the process by which the Sender is informed of the pre-conditions that it must satisfy, if any, before its message can be provided to the Recipient. Recipients tracked by the system are best described by two major variables: (1) the Recipients knowledge of the system, and (2) the Recipient's willingness to receive messages. If a Recipient is unaware of the system, but its physical contact information is still held by the point of contact data store 18, the Sender may provide an electronic version of the message to the system, and the system will physically print and mail the message. Furthermore, the Sender may be given the option of having the message delivered to the Recipient via different methods. For example, the Sender may be provided with the option of sending the message via email or via postal service, or both.

If the Recipient is aware of the service, they may be given the option of receiving messages or not receiving messages. Because all entities ultimately have some type of postal address, it is possible to establish a physical delivery address for even those Recipients that do not wish to receive messages from a system operating according to the present invention. Because the costs of sending a physical message, as opposed to an electronic message, to a Recipient are significantly higher than the costs of sending an electronic message, Senders may be asked to pay for the service of providing a physical message.

For those Recipients that are aware of the system and elect to receive messages, additional features may be offered, including the ability to provide Recipient Interaction Requests 204 to the Sender and the ability to access an email management service 210. An email management service 210 is described in greater detail below. Recipients may also be allowed to specify criteria that must be met before a message will be deemed deliverable to the Recipient. For example, the Recipient may request that no messages containing obscenities be provided to the Recipient.

Once the Sender satisfies the conditions required to send the message to the Recipient, the Sender enters the message into the system with a user message generator 50, and the message is provided to the Recipient, either electronically or physically by message fulfilment device 60.

Figure 4:
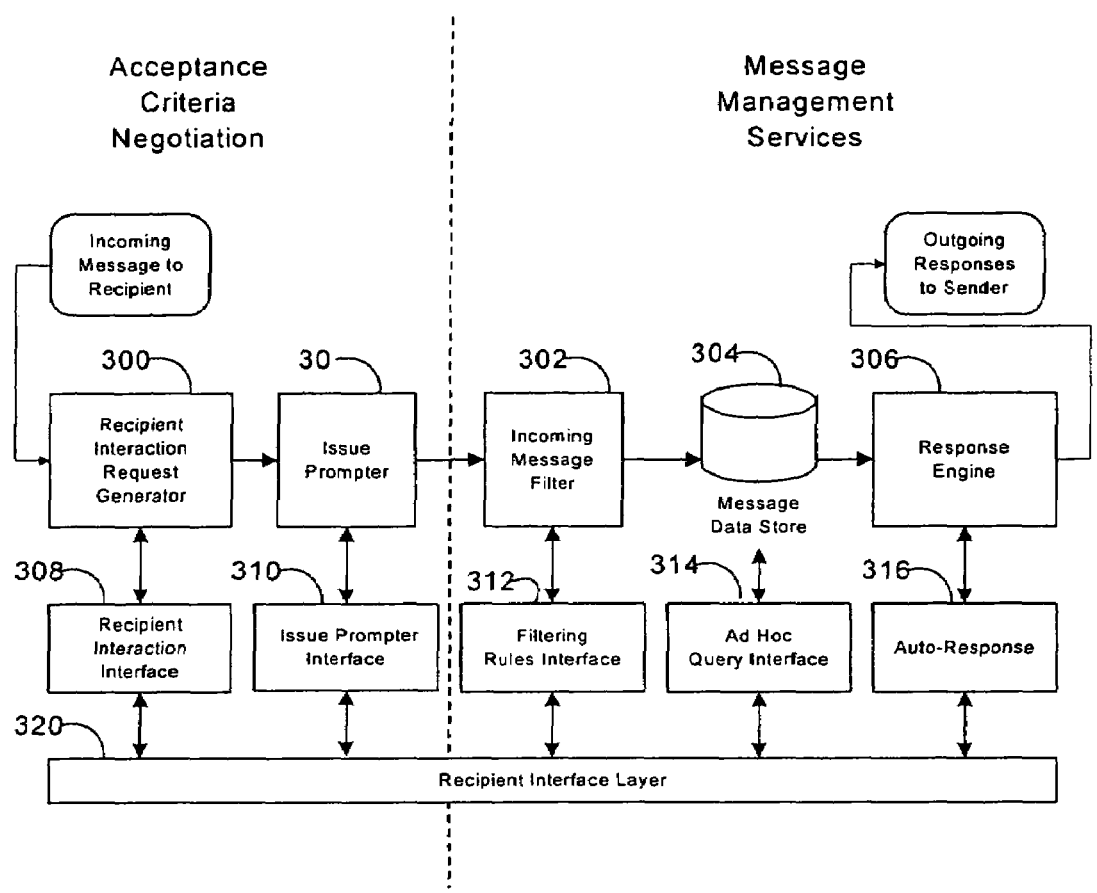
FIG. 4 is a flow diagram showing components of a system according to the present invention.

In FIG. 4, components of a Recipient email management service are illustrated. A Recipient interaction interface 308 allows the Recipient to place a Recipient interaction request as a pre-condition to accepting a message. Recipient interaction requests are information that a Participating Recipient wishes to display to a Sender before the Sender completes their message to the Recipient. These Recipient interaction requests could include a survey, advertisements, information about an upcoming event schedule, or a monthly update letter. The Recipient interaction requests are provided to the Sender by a Recipient interaction request generator 300 as part of the Acceptance Criteria Negotiation process.

Certain Senders may be allowed to monitor their own issues via the issue prompter interface 310 and the issue prompter 30. Normally, a system administrator has ultimate control over which issue prompts are served to a particular set of Senders, but a Recipient may be given control over the issue prompts. As an example, the system administrator may provide an issue prompt in conjunction with a particular Source Document, and a particular Recipient may wish to turn off this feature, thereby precluding the system's default issue prompt from being provided to Senders.

FIG. 4 illustrates that Recipients can use the filtering rules interface 312 to filter incoming messages using the incoming message filter 302. Recipients that utilize email management services are likely to receive large volumes of email, and therefore need the incoming message filter to collate and organize their messages. Using the incoming message filter 302 and the filtering rules interface 312 the Recipient can perform such tasks as removing and deleting any messages that contain obscenities or that are generated from particular Source Documents. Messages are then stored in the message data store 304 where they can be accessed through standard reports and an ad hoc query interface 314. Finally, through the auto-response interface 316 the Recipient can establish the rules by which he or she desires to reply to the Sender. For example, a Recipient may wish to send out an immediate auto-reply acknowledging receipt to all Senders who met the condition of a particular Recipient Interaction Request. All of the Recipient interfaces may be organized in a standard user interface through the Recipient interface layer 320.

It is anticipated that some Source Documents may be provided in HTML or other format corresponding to text information. As noted above, Source Documents may also be an audio signal, such as those associated with a television signal. When the Source Document is an audio signal, the document pre-processor 12 may scan the audio signal for any associated meta-data, subject tags, credits, or information provided for the hearing impaired. If such meta-data do not exist within the audio signal, the system uses voice recognition technology to determine the subject of the Source Document from the audio signal.

Up to this point, the description of the present invention has focused on sending a text message to the Recipient. The present invention may also be used to provide a voice message. In this embodiment, the contact information is a phone number, rather than an email or postal address. Once the Sender selects the Recipient, the Sender is prompted to speak the message. The message is recorded and may be delivered to a voice message machine at a phone number of the Recipient, or via the Internet to a computer having the ability to reproduce or transcribe the voice message for the Recipient.

It will be recognized that a method according to the present invention may be implemented via computer software running on a computer. The computer software has computer readable instructions for causing the computer to execute the method of the present invention. The present invention therefore includes an article of manufacture having a computer usable medium including computer readable program code for causing a computer to select contact information corresponding to an entity referenced in a Source Document. The computer readable program code in the article of manufacture has code for instructing the computer to (a) receive a signal corresponding to a source document, (b) analyze the signal to determine a referenced entity identified in the source document, (c) provide a data base of contact entities, the data base having contact information corresponding to a plurality of contact entities, (d) determine whether the referenced entity is among the contact entities, and (e) select the contact information corresponding to the referenced entity if the referenced entity is among the contact entities.

The computer readable program code may also cause the computer to (a) provide a message to the referenced entity, (b) receive the message from the sender, (c) analyze the message to determine whether the message satisfies criteria specified by the referenced entity, (d) provide the message to the referenced entity, (e) provide a preferred method of delivering the message, (f) allow the sender to select from a group of preferred methods of delivering the message, consisting of email and postal address, (g) prompt the sender to provide information required by the referenced entity, (h) provide to the sender conditions that the sender must satisfy prior to sending the message, (i) prompt the sender to provide information, and use the information provided by the sender to categorize the message, or (j) determine a key word in the source document that is associated with the referenced entity, and prioritize the selected contact information corresponding to the referenced entity by giving a high priority to contact information associated with the key word.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A computer implemented method of selecting contact information, comprising:

automatically comparing an electronic source document available on a network of computers to a database of entities to identify a referenced entity within the source document;

providing a data base of contact information, the data base of contact information having contact information corresponding to a plurality of contact entities;

automatically determining whether the referenced entity is among the contact entities;

if the referenced entity is among the contact entities, then selecting the contact information corresponding to the referenced entity;

providing to the sender criteria that a message must satisfy in order to be acceptable to the referenced entity;

prompting a sender to provide a message to the referenced entity; and using the contact information to send the message to the referenced entity.

2. The method of claim 1, further comprising receiving the message from the sender.

3. The method of claim 2, further comprising analyzing the message to determine whether the message satisfies the criteria.

4. The method of claim 3, wherein analyzing the message to determine whether the message satisfies criteria specified by the referenced entity includes determining whether the message has obscenities therein.

5. The method of claim 2, further comprising providing the message to the referenced entity.

6. The method of claim 1, prompting the sender to provide a preferred method of delivering the message.

7. The method of claim 6, wherein the preferred method may be provided by selecting from a group consisting of e-mail and postal address.

8. The method of claim 1, further comprising prompting the sender to provide information required by the referenced entity.

9. The method of claim 1, further comprising providing to the sender conditions that the sender must satisfy prior to sending the message.

10. The method of claim 1, further comprising:
prompting the sender to provide information; and
using the information provided by the sender to categorize the message.

11. The method of claim 1, wherein the contact information includes a postal address.

12. The method of claim 1, wherein the contact information includes an Internet address.

13. The method of claim 1, wherein the contact information includes a phone number.

14. The method of claim 1, further comprising:
determining a key word in the source document that is associated with the referenced entity; and
prioritizing selected contact information corresponding to the referenced entity by giving a high priority to contact information associated with the key word.

15. A computer implemented method of selecting contact information, comprising:
receiving an identifier corresponding to a source document available on a network of computers;
providing a data base having a plurality of identifiers, each of the plurality of identifiers having associated therewith contact information corresponding to entities referenced in the source document;
automatically determining whether the identifier corresponding to the source document is among the plurality of identifiers in the data base;
if the identifier is among the plurality of identifiers in the data base, then selecting the contact information corresponding to the entities;
providing to the sender criteria that a message must satisfy in order to be acceptable to at least one of the entities;
prompting the sender to provide a message to one of the entities identified in the source document; and
using the contact information to send the message to the at least one of the entities.

16. The method of claim 15, further comprising receiving the message from the sender.

17. The method of claim 16, further comprising analyzing the message to determine whether the message satisfies the criteria.

18. The method of claim 17, wherein analyzing the message to determine whether the message satisfies criteria specified by the referenced entity includes determining whether the message has obscenities therein.

19. The method of claim 16, further comprising providing the message to the referenced entity.

20. The method of claim 15, prompting the sender to provide a preferred method of delivering the message.

21. The method of claim 20, wherein the preferred method may be provided by selecting from a group consisting of e-mail and postal address.

22. The method of claim 15, further comprising prompting the sender to provide information required by the referenced entity.

23. The method of claim 15, further comprising providing to the sender conditions that the sender must satisfy prior to sending the message.

24. The method of claim 15, further comprising:
prompting the sender to provide information; and
using the information provided by the sender to categorize the message.

25. The method of claim 15, wherein the contact information includes a postal address.

26. The method of claim 15, wherein the contact information includes an Internet address.

27. The method of claim 15, wherein the contact information includes a phone number.

28. An article of manufacture comprising, a computer usable medium having computer readable program code means embodied therein for causing a computer to select contact information, the computer readable program code means in said article of manufacture comprising:
computer readable program code means for instructing the computer to compare an electronic source document available on a network of computers to a database of entities to identify a referenced entity within the source document;
computer readable program code means for instructing the computer to provide a data base of contact information, the data base on contact information having contact information corresponding to a plurality of contact entities;
computer readable program code means for instructing the computer to determine whether the referenced entity is among the contact entities;
computer readable program code means for instructing the computer to select the contact information corresponding to the referenced entity if the referenced entity is among the contact entities;
computer readable program code means for instructing the computer to provide to the sender criteria that a message must satisfy in order to be acceptable to the contact entities;
computer readable program code means for prompting the sender to provide a message to the referenced entity; and
computer readable program code means for instructing the computer to use the contact information to send the message to the referenced entity.

29. The article of manufacture of claim 28, further comprising computer readable program code means for receiving the message from the sender.

30. The article of manufacture of claim 29, further comprising computer readable program code means for analyzing the message to determine whether the message satisfies the criteria.

31. The article of manufacture of claim 29, further comprising computer readable program code means for providing the message to the referenced entity.

32. The article of manufacture of claim 28, computer readable program code means for prompting the sender to provide a preferred method of delivering the message.

33. The article of manufacture of claim 32, further comprising computer readable program code means for allowing the sender to select from a group of preferred methods of delivering the message, consisting of e-mail and postal address.

34. The article of manufacture of claim 28, further comprising computer readable program code means for prompting the sender to provide information required by the referenced entity.

35. The article of manufacture of claim 28, further comprising computer readable program code means for providing to the sender conditions that the sender must satisfy prior to sending the message.

36. The article of manufacture of claim 28, further comprising:
   computer readable program code means for prompting the sender to provide information; and
   computer readable program code means for using the information provided by the sender to categorize the message.

37. The article of manufacture of claim 28, further comprising:
   computer readable program code means for determining a key word in the source document that is associated with the referenced entity; and
   computer readable program code means for prioritizing selected contact information corresponding to the referenced entity by giving a high priority to contact information associated with the key word.

38. A contact information system, comprising:
   a signal processor capable of comparing an electronic source document available on a network of computers to a database of entities to identify a referenced entity within the source document;
   a data base of contact information, the data base of contact information having contact information corresponding to a plurality of contact entities;
   a comparator in communication with the signal processor and the data base, the comparator being capable of receiving from the signal processor information about the referenced entity identified in the source document, and being capable of determining whether the referenced entity is among the plurality of contact entities;
   a signal provider in communication with the comparator and the data base, the signal provider being capable of providing contact information from the data base if the referenced entity is among the plurality of contact entities, and being able to provide criteria that a message must satisfy in order to be acceptable to the referenced entity;
   a message provider in communication with the signal provider, the message provider being capable of prompting the sender to provide a message to the referenced entity, and send the message to the referenced entity using the contact information.

39. The system of claim 38, further comprising a message analyzer in communication with the message provider, the message analyzer being capable of analyzing the message to determine whether the message satisfies criteria specified by the referenced entity.

40. A computer implemented method of providing a sender with contact information, comprising:
   automatically comparing an electronic source document available on a network of computers to a database of entities to identify a plurality of referenced entities within the source document;
   providing a data base of contact information, the data base contact information having contact information corresponding to a plurality of contact entities;
   automatically determining whether the referenced entities are among the contact entities;
   providing a list of referenced entities that are among the contact entities;
   selecting from the list of referenced entities one of the referenced entities;
   selecting the contact information corresponding to the selected referenced entity;
   providing to the sender the selected contact information;
   providing criteria that a message must satisfy in order to be acceptable to the referenced entity;
   providing a list of contact information items corresponding to the selected referenced entity;
   selecting from the list of contact information items one of the contact information items; and
   providing the selected contact information item to the sender.

41. A method of claim 40, further comprising:
   providing counters, each counter being capable of providing a cumulative total, and each counter being associated with one of the referenced entities;
   incrementing one of the counters when the associated referenced entity is selected;
   prioritizing the list of referenced entities by the cumulative totals provided by the counters.

42. A method of claim 41, further comprising:
   providing counters, each counter being capable of providing a cumulative total, and each counter being associated with one of the selected contact information items;
   incrementing one of the counters when the associated contact information item is selected;
   prioritizing the list of contact information items by the cumulative totals provided by the counters.

* * * * *